United States Patent

[11] 3,625,162

[72] Inventor Beatrice L. Crew
 5120 Abbott Road, South Gate, Calif. 90280
[21] Appl. No. 66,157
[22] Filed July 21, 1970
[45] Patented Dec. 7, 1971

[54] SINK DIVIDER SUPPORTED UTILITY BOARD
 4 Claims, 6 Drawing Figs.
[52] U.S. Cl. .................................... 108/47,
 248/172, 248/205, 297/352
[51] Int. Cl. ........................................ A47b 5/00
[50] Field of Search ............................ 108/44–49,
 135, 158; 248/188.1, 9, 172, 205; 247/144, 352

[56] References Cited
UNITED STATES PATENTS

| | | | |
|---|---|---|---|
| 1,155,383 | 10/1915 | Tischer | 248/172 X |
| 1,495,991 | 6/1924 | Drynan | 248/172 |
| 1,986,935 | 1/1935 | Levine | 108/47 X |
| 2,297,193 | 9/1942 | Silverman | 248/188.1 X |
| 2,654,421 | 10/1953 | Neff | 248/188.1 X |
| 3,136,517 | 6/1964 | Gariery | 248/188 |
| 243,617 | 6/1881 | Porter | 297/352 |

Primary Examiner—Francis K. Zugel
Assistant Examiner—Glenn O. Finch
Attorney—William C. Babcock ABSTRACT: A flat rigid rectangular member having a first work-supporting surface and second surface oppositely disposed therefrom, which second surface has a number of diagonally positioned slots of T-shaped transverse cross section extending inwardly into said member therefrom, with said slots intersecting at a central opening, and each of said slots slidably supporting a nut in a nonrotatable position within the confines thereof. Four legs are provided that have threaded studs extending upwardly therefrom which studs are insertable in said slots, and by rotation of said legs engaging said nuts. By rotation of the legs relative to the nuts, the legs may be forced into friction gripping contact with said second surface to so position the legs that said member may be removably mounted on the divider of a sink to provide a work surface for such kitchen chores as slicing fruit, cleaning pots and pans and the like. By removing the device from the divider and placing it in an inverted position, the free ends of the legs provide a convenient means supporting a hot pan or skillet in a location adjacent a stove, but without danger of the heated utensil defacing or burning the surface on which the device rests.

PATENTED DEC 7 1971 3,625,162
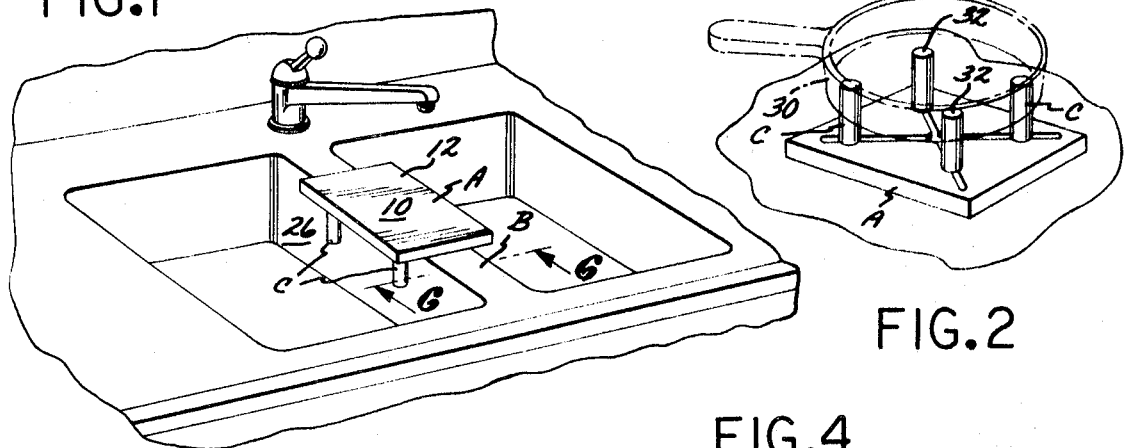
FIG.1
FIG.2
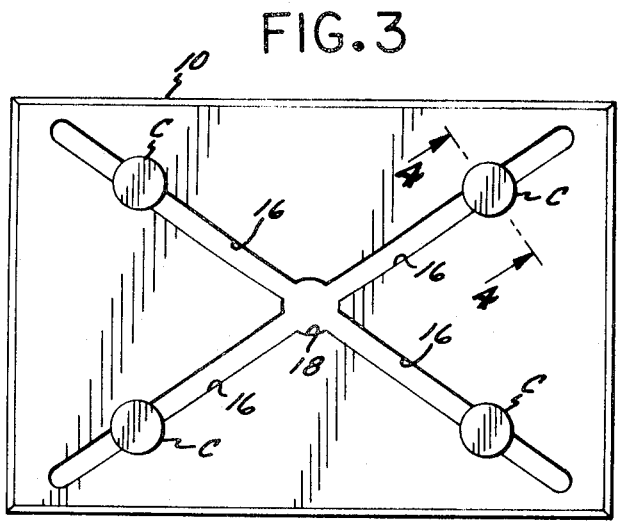
FIG.3
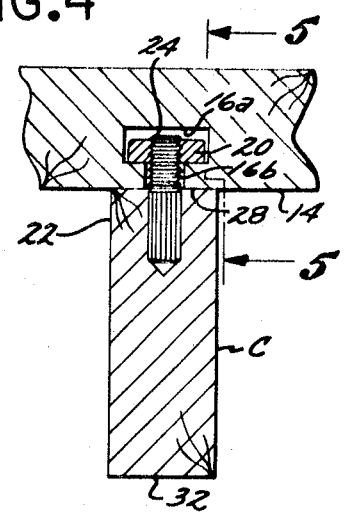
FIG.4
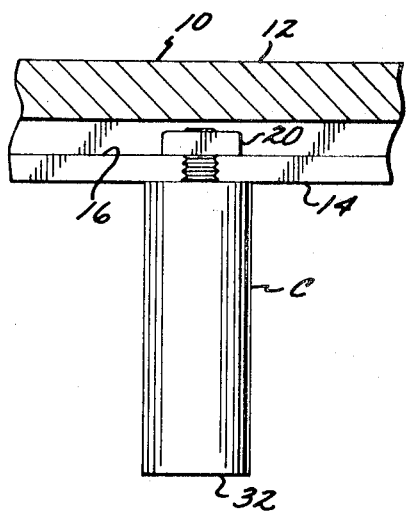
FIG.5
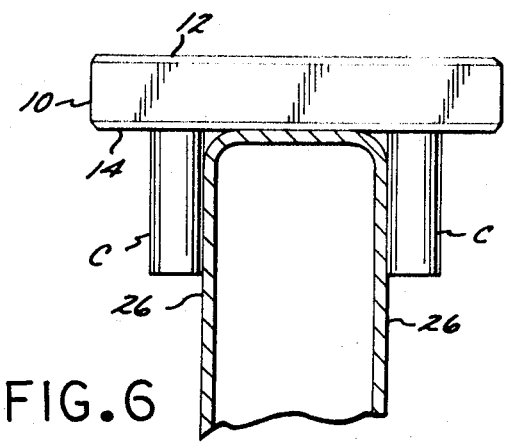
FIG.6
INVENTOR.
*BEATRICE L. GREW*
BY
*William G. Babcock*
*ATTORNEY*

3,625,162

SINK DIVIDER SUPPORTED UTILITY BOARD

BACKGROUND OF THE INVENTION

1. Field of the Invention

A sink divider supported utility board.

2. Description of the Prior Art

Many residences, apartments and other living quarters are provided with relatively small kitchens. Numerous of such kitchens have divided sinks installed therein, but with the work area adjacent the sinks being relatively small. A housewife in preparing a meal in such a small kitchen quite often has the supporting surfaces adjacent the sink occupied by food products in the course of preparation, as well as electrical appliances and appurtenances used in connection with the cooking and preparation of the food.

It is frequently desirable during the preparation of a meal to have an additional free work area, where such chores as the scrubbing and scouring of a pan, the slicing of fruit, or like chores may be carried out. The purpose of the present invention is to provide such an additional work area, without in any way altering the existing divided sink, or the work area adjacent to the sink.

SUMMARY OF THE INVENTION

A work area providing device that may be removably mounted on the divider of a sink and easily and quickly adjusted to firmly grip the same. The work area defining device includes a flat rectangular member having a first flat upper surface on which fruit may be sliced, pots and pans scoured and the like. The member includes a second lower surface that has four diagonally positioned slots of T-shaped cross section extending inwardly therefrom, with each slot slidably but nonrotatably supporting a square nut that has the tapped bore therein axially aligned with the narrower portion of the slot.

Four legs are provided that have threaded studs that project upwardly therefrom that may threadedly engage the nuts. By rotating the legs and studs, the upper ends of the legs may be brought into frictional pressure contact with the second surface of the work area defining member. The legs may accordingly be vertically and longitudinally adjusted on the member to firmly grip a sink divider and removably maintain the work area defining member in a stable position thereon.

Thus, the device is not limited to use on a divider of a particular transverse cross section, but may be adjusted for use on any of the dividers that are included as a part of a divided modern sink. Should it be desired to support a hot pan, skillet or the like, the device may be removed from its sink divider supported position and inverted to cause the first surface thereof to rest on an area adjacent the sink or stove. The hot pan or skillet may than be placed on the upper ends of the legs and allowed to cool without danger of the area adjoining the sink or stove being defaced by contact with the heated utensil.

A major object of the present invention is to provide a sink divider supported work area defining device that may be easily and quickly adjusted to the width of a particular sink divider, and removably supported thereon for such kitchen chores as slicing fruit, cleaning pots and pans, and the like.

Another object of the invention is to furnish a sink divider supported work area defining member that is extremely simple mechanical structure, may be fabricated from commonly available materials such as wood or the like, is inexpensive to manufacture, is easily used, and provides additional work area in a small kitchen without the expense of remodeling the latter.

A still further object of the invention is to provide a device that not only supplies a work area defining surface when mounted on a sink divider, but may be used when in a inverted position to support hot skillets, pans and the like to eliminate the danger of such heated utensils defacing a surface area in the kitchen on which they might otherwise be rested or supported.

BRIEF DESCRIPTION OF THE DRAWING

FIG. 1 is a perspective view of a double sink having a divider on which the work area defining device is removably mounted;

FIG. 2 is a perspective view of the work area defining device in an inverted position to support a hot skillet or utensil on the upper extremities of the legs that form a part thereof;

FIG. 3 is a bottom plan view of the device;

FIG. 4 is a first cross-sectional view of the device taken on the line 4—4 of FIG. 3;

FIG. 5 is a combined side elevational and vertical cross-sectional view of the device taken on the line 5—5 of FIG. 4; and FIG. 6 is a combined side elevational and vertical cross-sectional view of the device removably mounted on a sink divider.

DESCRIPTION OF THE PREFERRED EMBODIMENT

The sink divider supported work area defining device A is shown in the drawing removably mounted on a sink divider B in FIG. 1. The divider B need not be of particular width, as the device A is adjustable to conform to the particular width of a divider in a user's home. The device A includes a flat rectangular member 10 that has a first upper work surface 12 and a second oppositely disposed surface 14. The second surface 14 has four diagonally positioned slots 16 extending into the member 10 therefrom. Each of the slots 16 as may best be seen in FIG. 4 is of transverse T-shaped cross section, with the slots intersecting at the center of the member in an opening 18. Each of the slots 16 as may best be seen in FIG. 4 includes a first portion 16a in which square nut 20 may be slidably but nonrotatably mounted. The slot portion 16a is of such width that the nut 20 cannot rotate within the confines thereof. Slot portion 16a is in communication with a second slot portion terminating at the second surface 14 as shown in FIG. 4. The opening 18 is of sufficient size to permit the nuts to be slidably positioned within the confines of the slots 16.

Four legs C are provided as may be seen in FIG. 2, with each leg on a first end portion 22 thereof supporting a threaded stud 24. Each threaded stud 24 is of such transverse cross section as to be slidably insertable through one of the slot portions 16b to threadedly engage one of the nuts 20, when the leg C of which the stud forms a part is rotated in an appropriate direction.

The device A is preferably retailed in a knocked down condition for compactness in packaging the same, and is easily assembled after purchase by simply rotating the studs 24 into the nuts 20 for the device to have the configuration shown in FIGS. 1 and 2. The device is adapted for the width of a particular divider B, by simply placing the device thereon as shown in FIG. 1 and moving the legs C until they contact the sides 26 of the divider.

The device A is then removed from the divider and the legs C are sequentially rotated to cause the studs 24 to move inwardly relative to the nuts 20 with which they are in engagement, and such rotation continued until the upper surfaces 28 of the legs C are in abutting frictional engagement with the second surface 14 of the member 10. After all the legs have been rotated to positions where they are held in a fixed relationship with the member 10, the device A may be mounted on the divider B as shown in FIG. 1 whereupon it may thereafter be used for such kitchen chores as slicing fruit, cleaning and scouring pots and pans and the like. Should the housewife have a heated pan or skillet that she desires to support, and has no available space for such purpose, the device A may be removed from the divider B and placed in an inverted position as shown in FIG. 1 on a convenient surface. The heated skillet 30 shown in phantom line in FIG. 2 may now be rested on the surfaces 32 of the legs C, and the danger of inadvertent burning or marring a surface eliminated. The member 10 and legs C are preferably formed from wood to prevent marring or scratching the divider B when the device A is mounted thereon. Forming the member 10 from wood also provides the advantages that a knife will not be dulled from contact therewith, and pots and pans will not slip when resting thereon.

The use and operation of the device has been previously described and need not be repeated.

What is claimed is:

1. A work area defining device capable of being removably supported on the divider of a sink, and device including:
   a. a rectangular rigid member of substantial thickness that defines a first work area surface and a second oppositely disposed surface, said second surface having four diagonally positioned slots extending inwardly therefrom, with said slots intersecting an opening that extends inwardly from said second surface and is located at substantially the center of said member, and each of said slots of transverse T-shaped cross section;
   b. four square nuts of such transverse cross section as to be inserted into the wider portions of said slots through said opening, with each of said nuts being slidably but nonrotatably movable in said slot in which said nut is disposed;
   c. four legs that have flat first end surfaces; and
   d. four threaded studs secured to said legs and extending outwardly from said first end surfaces, said studs extending through the narrower portions of said slots to threadedly engage said nuts, with said legs and studs when rotated after said legs have been adjusted to grip said divider therebetween being moved inwardly for said first end surfaces of said legs to frictionally contact said second surface of said member for said legs to remain at fixed positions relative said member, and said member and legs when mounted on said divider remaining in a stable position thereon.

2. A device as defined in claim 1 in which said member is formed from a nonmetallic material that will not dull a knife by contact therewith or permit a pan or skillet to slip when the latter are rested thereon for cleaning purposes.

3. A device as defined in claim 2 in which said member and legs are formed from wood and legs are formed from wood to prevent said divider being scratched or defaced by pressure contact therewith.

4. A device as defined in claim 1 in which said member is of sufficient transverse cross section that when said first surface thereof is rested on a supporting surface, said member provides a stable base for said legs to permit a heated skillet to be supported on the upper extremities of said legs.

* * * * *